(12) United States Patent
Willén

(10) Patent No.: US 6,684,486 B1
(45) Date of Patent: Feb. 3, 2004

(54) METHOD FOR CONSTRUCTING A SUPERCONDUCTING MULTIPHASE CABLE COMPRISING N PHASES

(75) Inventor: Dag Willén, Søborg (DK)

(73) Assignee: NKT Research Center A/S, Brondby (DK)

( * ) Notice: Subject to any disclaimer, the term of this patent is extended or adjusted under 35 U.S.C. 154(b) by 0 days.

(21) Appl. No.: 09/600,554
(22) PCT Filed: Nov. 22, 1999
(86) PCT No.: PCT/DK99/00645
§ 371 (c)(1),
(2), (4) Date: Sep. 19, 2000
(87) PCT Pub. No.: WO00/31754
PCT Pub. Date: Jun. 2, 2000

(30) Foreign Application Priority Data

Nov. 20, 1998 (DK) ................................ PA 1998 01533

(51) Int. Cl.[7] ................................................ H01L 39/24
(52) U.S. Cl. .......................... 29/599; 505/230; 505/430
(58) Field of Search .......................... 29/599; 505/230, 505/231, 430, 431

(56) References Cited

U.S. PATENT DOCUMENTS

| | | |
|---|---|---|
| 3,947,622 A | 3/1976 | Graneau |
| 4,176,238 A | 11/1979 | Vulis et al. |
| 4,327,244 A | 4/1982 | Horvath |
| 4,549,042 A * | 10/1985 | Akiba et al. ............ 174/114 R |
| 6,393,690 B1 * | 5/2002 | Snitchler et al. ............... 29/599 |
| 6,448,501 B1 * | 9/2002 | McIntyre et al. ............. 29/599 |
| 6,576,843 B1 | 6/2003 | Ashworth |

FOREIGN PATENT DOCUMENTS

| | | |
|---|---|---|
| DE | 4340046 A1 | 11/1993 |
| EP | 0786783 A1 | 12/1996 |
| JP | 1-231217 | 9/1898 |

* cited by examiner

Primary Examiner—David P. Bryant
(74) Attorney, Agent, or Firm—Pearne & Gordon LLP

(57) ABSTRACT

By a method for constructing a superconducting multiphase cable comprising N phases, the phases are divided into n groups with N phases in each group, all the groups have a common screen. The individual groups may be geomtrically formed with coaxial or flat phases. The individual phases in each group may further be divided into individual conductors such as tapes. The insulation between the individual conductors in the groups may be separately insulated from each other or have a common insulation. In a particularly appropriate embodiment, the number of groups is 1 and implemented with a flat or concentric geometry. In this way, a compact superconducting power cable is provided, which is relatively inexpensive in production and has few working operations while maintaining good electrical properties.

15 Claims, 3 Drawing Sheets

METHOD FOR CONSTRUCTING A SUPERCONDUCTING MULTIPHASE CABLE COMPRISING N PHASES

Figure 1:
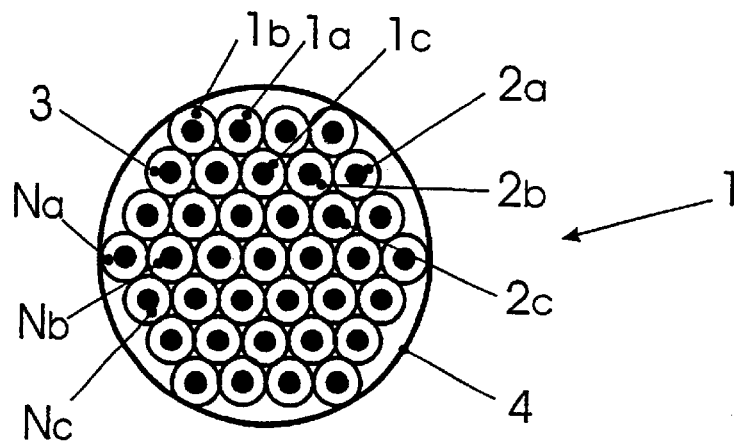

The invention relates to a method for constructing a superconducting multiphase cable comprising N phases, wherein each phase in the cable is divided into a number of conductors and wherein insulation means are arranged in the cable, the phases being divided into n groups, each group having N different phases.

Superconductor cables utilize the lower resistance in superconductor materials achieved when the superconductor material is exposed to a temperature that is lower than its so-called critical temperature. This temperature may be e.g. 4–7 K (low temperature superconductor, LTS) or 30–10 K high temperature superconductor, HTS). For use at ambient temperature, an artificial refrigerant and a thermal insulation are usually required in order to separate the cable conductor thermally from its surroundings.

Superconductor cables may be produced from a superconducting band wound around a central refrigerating channel. A layer of electrically conducting material is then coaxially applied. A coaxial screen which is either superconducting or normally conducting may then be applied. A thermally insulating layer may be applied either between the inner superconducing layer and the electrical insulation or on the outside of the electrical insulation. Thus, the electrical insulation is either exposed to a high temperature (ambient temperature) or a low temperature (cryogenic temperature). Further, such a cable may have an outer diameter typically in the range from 8 to 15 cm.

The electrical AC loss occurring in the superconductor may be reduced by winding a superconducting band or wire around a refrigerating channel, said winding being made with climbing angles in such a way that an even current distribution among the individual bands/wires is obtained. They may also be wound around several refrigerating channels, e.g. as disclosed in U.S. Pat. No. 4,327,244.

If the current-carrying capacity of cables of this type is to be increased, this may be obtained by increasing the quantity of superconducting material. However, this leads to an increased generation of reactive power, since the reactance/inductance of the cable becomes relatively high, which may cause undesired phase shifts in the conveyed electrical voltage and current, especially in long cable sections but also in short cable sections to which a low voltage is applied and a high current is conducted. Normally, this reactance/inductance may be reduced by increasing the diameter of the inner semiconductor by e.g. 30–50 cm. Even though the reactance/inductance is decreased thereby, this reduction also has drawbacks such as e.g. larger dimensions of the cables, increased consumption of materials, and finally an increased heat transfer because of the increased area of the thermal insulation.

Other methods are disclosed in the literature, which allow reduction of the reactance/inductance of a superconducting cable system. Normally, electrical insulation and electrical screening are included in known cable systems for AC single-phase cables, wherein 3 cables with one phase conductor each are used for providing 3 phases.

From EP 0 786 783 A1 a multiphase superconducting cable is known, in which the individual phases are divided into a number of individual conductors. Each of the individual conductors is isolated from each other and equipped with a superconducting screen. Evidently, this results in a rather expensive and bulky cable, since each individual conductor constitutes a "cable" with a conductor, a screen and two layers of insulation.

DE 4340046 A1 discloses a superconducting cable, in which 3 phases are located coaxially in relation to each other and are surrounded by a common return circuit. Reduced consumption of material is thus rendered possible, since 3 phase conductors have a common screen. The diameter of the individual phase conductors may be increased with the purpose of reducing the inductance without an increase of the volume being required which would be the case if 3 individual cables were used. However, the drawback is that a sufficiently reduced inductance will not be obtained, since the relationship between the reactance and the diameter is logarithmic.

Similarly, from JP 123127 a multiphase superconducting cable is known, in which the individual phase conductors consist of a refrigerating channel, a superconducting phase conductor, an electrical insulation, in which each individual phase conductor is surrounded by a normally conducting screen. This reduces the consumption of superconducting material. Since the normally conducting screen is resistive, according to this technique it is necessary to minimize the current induced in these resistive screens by arranging the individual phase conductors in a triangular pattern, in which each individual phase conductor has a different phase as a neighbor.

Both phase divisioning techniques discussed above have the advantage that the reactive power production is reduced, cf. the law of parallel coupling of reactances/inductances. Reducing the electric current in each individual phase conductor also reduces the magnetic field at the surface of the phase conductor and the electrical AC loss in the superconducting material.

Thus, the drawback of these known techniques is that the individual phase conductors consist of complete, independent cables with refrigerating channel, cable conductors, electrical insulation and electrical screen. In practice, it is impossible to produce a compact and inexpensive cable if a high number of groups with a number of phases in each group are desired.

It is an object of the invention to facilitate the manufacturing of a superconducting power cable, preferably for use at 1 kV–132 kV, and superconducting power cable being less bulky, having a higher efficiency and lower manufacturing costs as compared to the output, also for large number of groups. It is a further purpose to reduce the reactance/inductance in a superconducting cable system, without the cable system being bulkier or more expensive than known hitherto.

The object of the invention is fulfilled by a number of N groups of phase conductors being assembled in groups and by one or more of the groups being equipped with a common electrical screen.

In this way, a cable may be manufactured in such a way that the electrical insulation may be produced in essentially one working step which is performed before the various phase conductors are assembled into a cable either by application on the phase conductors of the individual superconductors and/or by production of an electrically insulating foil. Hence, a production is obtained, which is more compact and has lower costs associated thereto, since the number of working operations during production of the cable may be reduced, the individual phases not having individual electrical screens.

For further minimization of the manufacturing costs, it is preferred, as specified in claim 2, that the individual phases only contain superconducting cable wire and an insulation system.

For further simplification of the manufacturing process, the groups may, as specified in claim 3, be arranged in n coaxial groups, either with several different phase conductors in each coaxial layer or with each individual phase conductor in a separate coaxial layer. In this way, a more simple refrigeration system with a limited number of flow paths for refrigerants could be provided.

By arranging the groups in N flat phases as specified in claim 4, the magnetic field generated by current in the phases will be relatively long, so that the magnetic induction in the cable is reduced. In this arrangement, preferably, one or more electrically insulating foil systems may be used as electrical insulation, said foil system(s) consisting of one or more layers of insulating and optionally electrically conducting materials. Use of electrically conducting layers of foil or surface coatings implies that this coating may optionally be removed from selected parts of the foil or it may be selected not to apply this coating on selected parts of the foil.

Further, appropriate embodiments of the invention are specified in the dependent claims.

Figure 2:
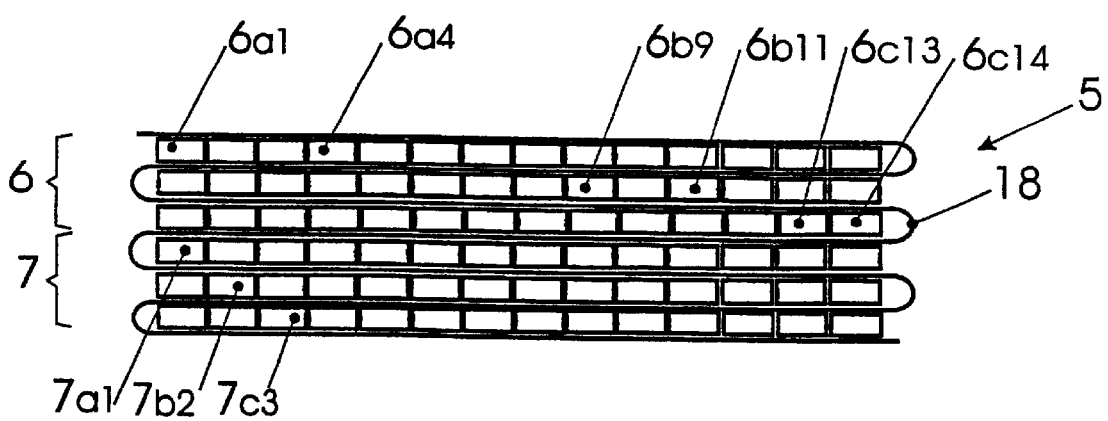
Figure 3:
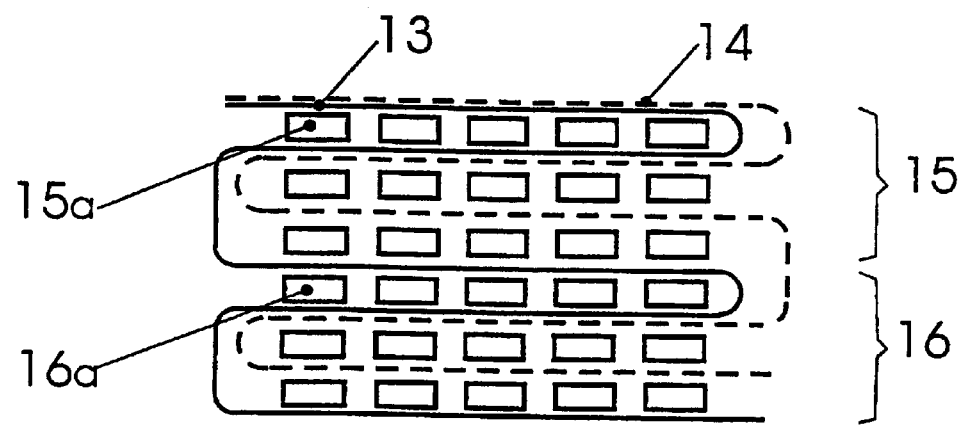
Figure 4:
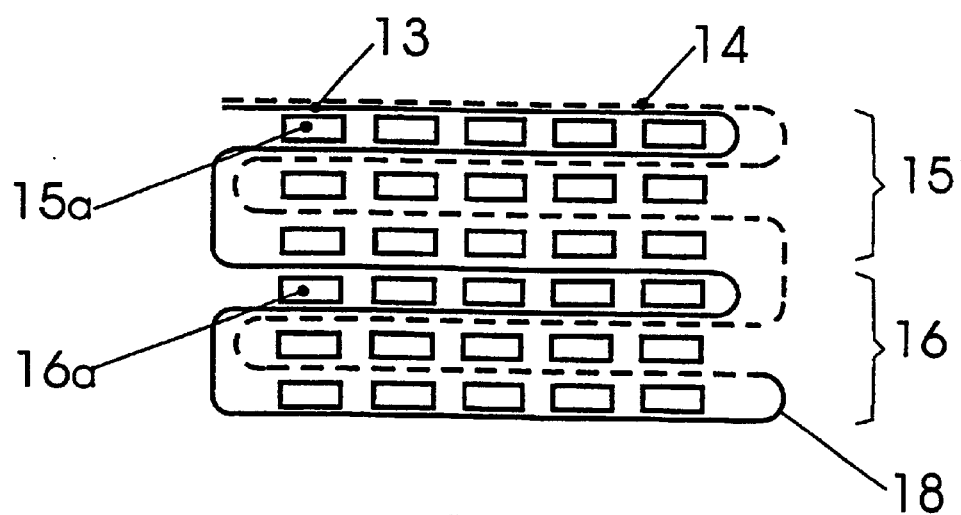
Figure 5:
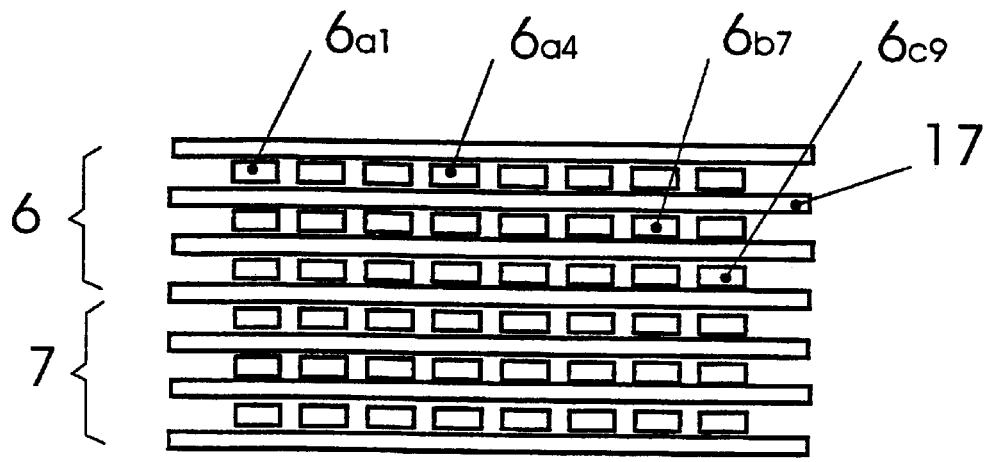
Figure 6:
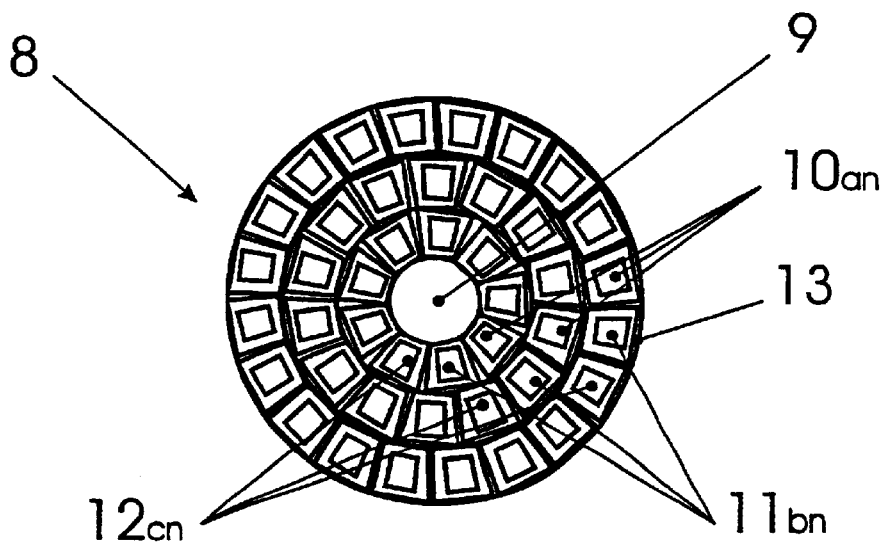

The invention will now be described in greater detail with reference to the exemplary embodiments of the invention illustrated in the drawings, in which FIG. 1 shows schematically a first embodiment of the cable according to the invention, FIG. 2 is a second embodiment of the cable according to the invention, FIG. 3 is a first variant of the embodiment according to FIG. 2, FIG. 4 is a second variant of the embodiment according to FIG. 2, FIG. 5 is a third variant of the embodiment according to FIG. 2, and FIG. 6 is a third embodiment of the cable according to the invention.

In FIG. 1, 1 designates a superconducting cable in its entirety in a first embodiment of the invention. The cable in the example shown in a 3 phase cable, in which each phase is denoted by one of the letters a, b or c. The phases are divided into a number of individual conductors which are designated by a numeral 1-n. Thus, the designation $n_a$ designates a conductor no. n with the phase a.

As shown, the conductors are divided into a number of groups n, each of the groups having a number of conductors, corresponding to the number of phases which is 3 in the example shown. Alternatively, the number of groups may be large, preferably larger than 10 and more preferably larger than 100. Around all of the individual conductors, a surrounding neutral conductor 4 is shown, which may constitute a common screen. According to the invention, this common screen may surround one or more phase groups. The refrigerant may be applied to each individual phase conductor, each individual group a number of groups, or preferably the entire cable with a pipe system. The refrigerant may flow in one or more directions in this pipe system.

This construction of the cable, especially in the preferred embodiment, provides an extremely compact construction with optimum electrical properties such as low impedance.

A second embodiment of a superconducting power cable according to the invention is shown in FIG. 2.

As compared to the embodiment of FIG. 1, a flat 3 phase cable 5 is shown, in which each phase is again designated by a,b,c. In the example shown, the phases are divided into 2 groups 6 and 7 but naturally, there is nothing to prevent the number of groups from being 1 or more. As shown, each phase in each group consists of a number of tapes arranged in rows. In the example shown, all the rows are separated by the same insulation 18. Alternatively, a broad band with a corresponding geometry may be implemented as shown in FIG. 5, in which each phase in each group is separated by layers of insulation. FIG. 3 shows a further variant, wherein each individual phase from each group is comprised by the same insulation as FIG. 3, denoted by 13 and 14. In this way, an electrical insulation is obtained, in which each individual surface of an insulating band only relates to one specific phase. The risk or leakage current between phases is thus reduced. If, as shown in FIG. 4, cf. reference number 18, the 2 foil system of FIG. 3 are assembled to a continuous foil, a further extended leakage path is obtained without increased space requirements. Thus, in the mentioned embodiments, the magnetic fields induced in cable, which are generated during conduction of current, have to travel a longer distance, which in turn results in a lower cable impedance.

FIG. 6 shows a variant of the embodiment according to FIG. 5, FIG. 6 showing a cable with a circular cross section, in which the individual phases 10–12 are arranged concentrically. As shown, each layer consists of a number of tapes arranged in a manner analogous to the embodiment of FIG. 4, i.e. there are n tapes in each layer. Thus, there are several groups of n phase conductors in each layer. Finally, the figure shows a common channel 9 for refrigerant. However, cooling may be provided in various ways in a pipe system. The mentioned electrical screen which may surround one or more groups of phases may consist fully or partially of superconducting, metallic, and semiconductor materials, even in combination with non-conducting materials and composites such as e.g. impregnation of paper with coal powder.

One or more of these composites may be impregnated with porous or non-porous polymer or ceramic material which may have a high or a low thermal conductivity, so that cooling may take place by means of solid conduction and/or by means of a medium such as liquid or gaseous $N_2$, $He_2$ or Ne penetrating into the porous material and between one or more of the phases or groups of phases. It may be envisaged that the refrigerant or an alternative refrigerant may impregante the electrical insulation in order to improve the electrical insulation properties.

Even though the invention has been explained in connection with the specific embodiments discussed together with the FIGS. 1–3, there is, naturally, nothing to prevent other embodiments from being formed within the scope of the claims. The cross sections of the cables may e.g. take other forms; they may e.g. be oval, angular, and the like.

What is claimed is:

1. A method for constructing a superconducting cable comprising N phases, the method comprising the steps of
    providing each phase in the cable in the form of a number of phase conductors,
    classifying the phase-conductors in N-phase groups, each N-phase group comprising a phase conductor from each of N different phases, where N is greater than one,
    arranging insulation means in the cable around each phase conductor or between assemblies of phase conductors,
    providing one or more of the N-phase groups of assemblies of N-phase groups with a common electrically conductive screen.

2. A method according to claim 1, wherein the individual phases only contain superconducting cable wire and an insulation system.

3. A method according to claim 1 or 2, wherein the N-phase groups are arranged in a number of coaxial groups, either with several different phase conductors corresponding to different phases in each coaxial layer or with each individual phase conductor of a particular phase in a separate coaxial layer.

4. A method according to claim 1 or 2, wherein the N-phase groups of each of the assemblies of N-phase groups are arranged so that the phase conductors form N flat phases.

5. A method according to claim 1 or 2, wherein each of the phase is constructed by one or several individual conductors such as tapes.

6. A method according to claim 1, wherein all N-phase groups are gathered in one assembly which is surrounded by one common electrical screen.

7. A method according to claim 6, wherein the N phases are arranged concentrically with concentric insulation between each of the N phases.

8. A method according to claim 1, wherein the phases in each N-phase group or assembly of N-phase groups are separately and electrically isolated from each other.

9. A method according to claim 1, wherein the phase in each N-phase group or assembly of N-phase groups are isolated from each other by a common insulator.

10. A method according to claim 1, wherein the number of N-phase groups is larger than 10.

11. A method according to claim 1, wherein the electrical screen is kept at 0 potential and consists fully or partially of superconducting, metallic, and semiconducting materials or of a combination of these materials with non-conducting materials and composites and is positioned close to the electrically insulating material.

12. A method according to claim 1, wherein the individual phases in each N-phase group or assembly of N-phase groups have such permittivity that they co-operate magnetically.

13. A method according to claim 1, wherein at least one of the phases is constituted by a neutral conductor.

14. A method according to claim 1, wherein the number of N-phase groups is larger than 100.

15. A superconducting cable consisting of N phases, wherein each phase in the cable comprises a number of phase conductors, the phase-conductors having been classified into N-phase groups, each N-phase group comprising a phase conductor from each of the N-different phases, where N is greater than one, and wherein insulation means have been arranged in the cable around each phase conductor or between assemblies of phase conductors, and one or more of the N-phase groups or assemblies of N-phase groups has/have been provided with a common electrical screen.

* * * * *